May 29, 1951 P. J. COMEAU 2,554,776
AUTOMOBILE LUGGAGE CARRIER
Filed Oct. 25, 1948 2 Sheets-Sheet 2
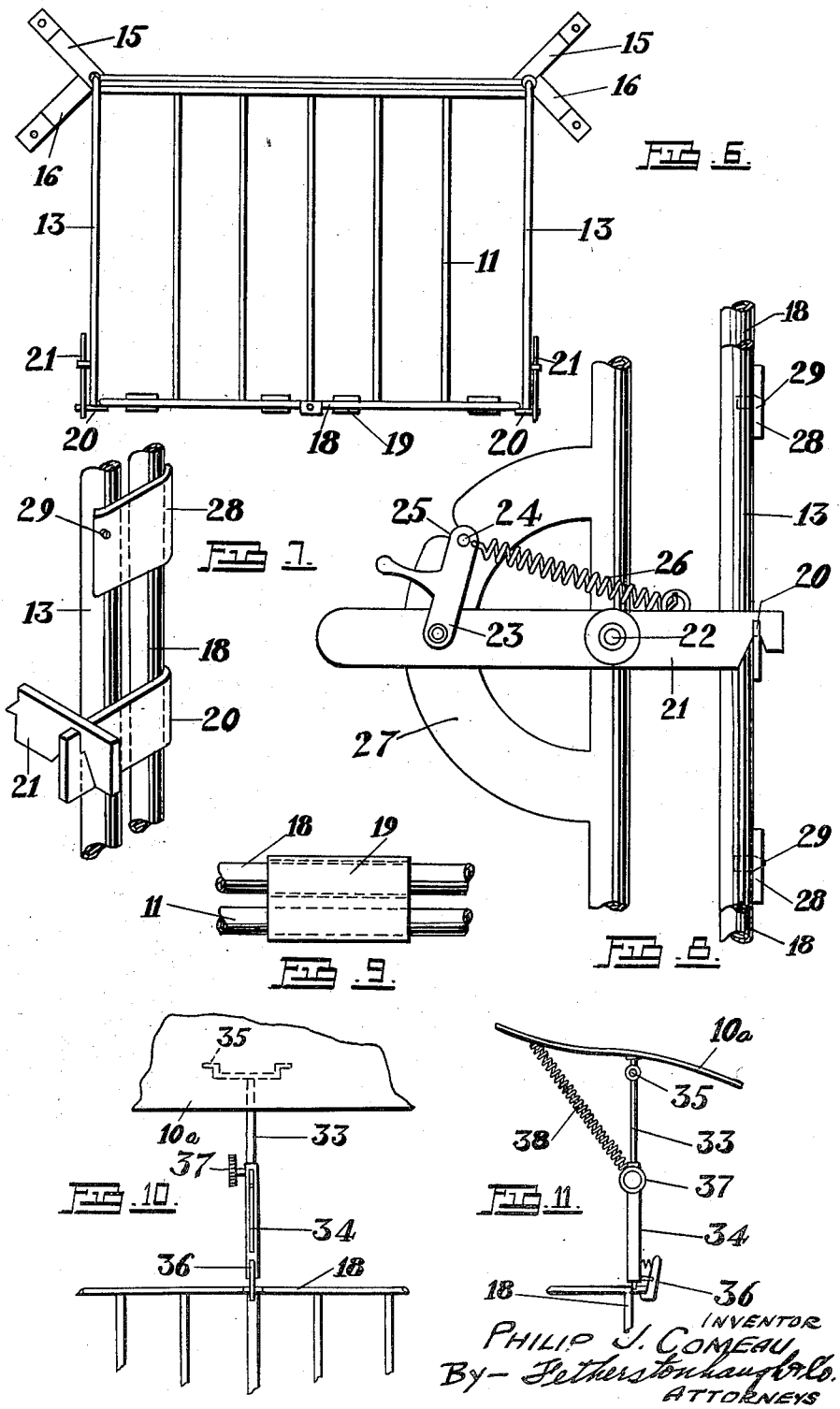
INVENTOR
PHILIP J. COMEAU
By- Fetherstonhaugh & Co.
ATTORNEYS Patented May 29, 1951

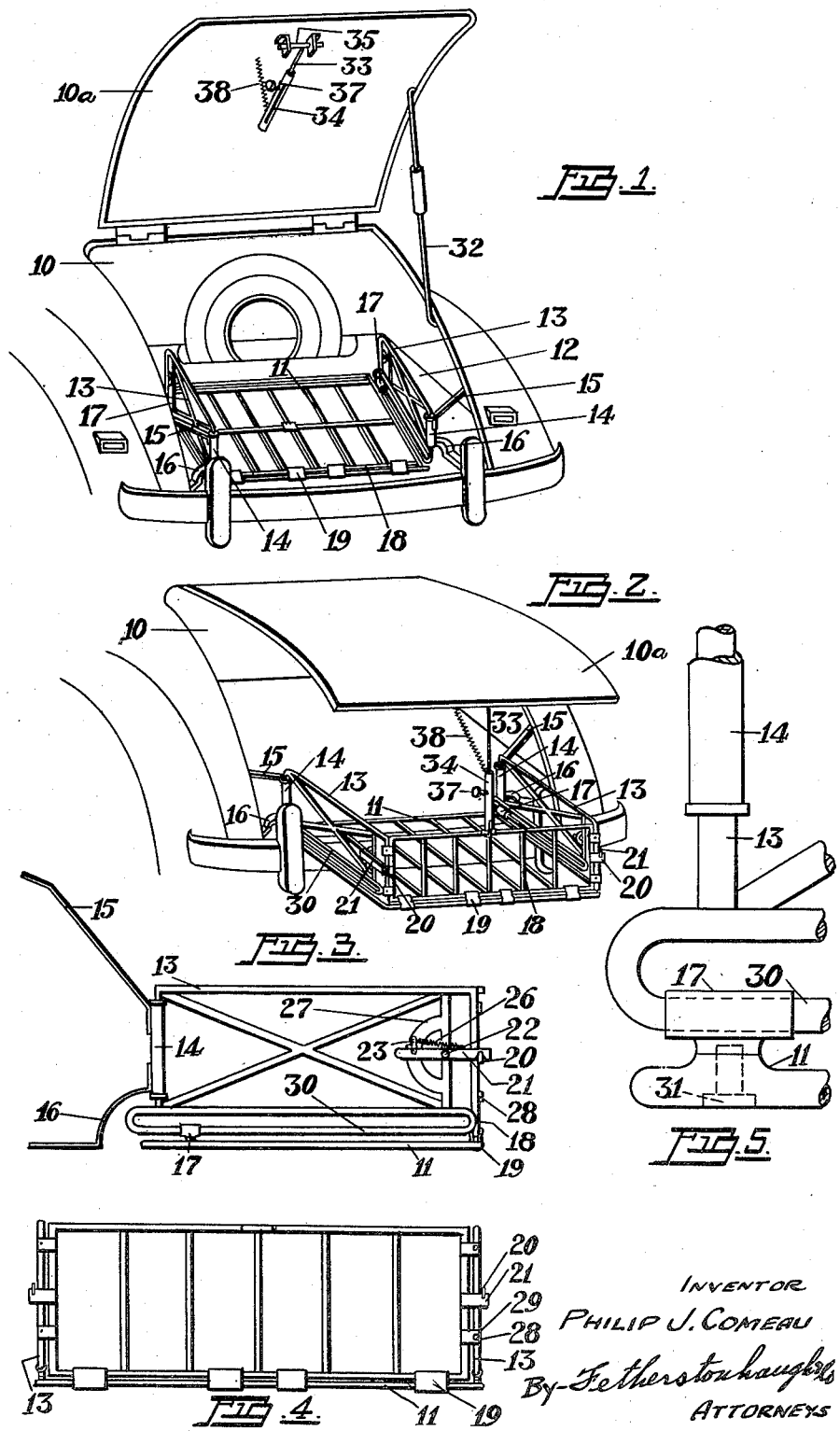

2,554,776

UNITED STATES PATENT OFFICE 2,554,776

AUTOMOBILE LUGGAGE CARRIER

Philip J. Comeau, Halifax, Nova Scotia, Canada

Application October 25, 1948, Serial No. 56,269
In Canada January 28, 1948

2 Claims. (Cl. 224—42.42)

1

The invention relates to automobile luggage carriers, and is concerned with a carrier which is adapted to lie within or extend from an automobile trunk.

Foldable luggage carriers for automobiles have usually consisted of a platform mounted to the rear of an automobile by brackets which may be folded to bring the platform vertically against the automobile body. This known type of carrier is not satisfactory on an automobile having a door which exposes the rear of the trunk when open, since the carrier folds up against the door of the trunk and interferes with its operation. Even when not in use, the folded carrier detracts from the outer appearance of the automobile.

According to the invention a luggage carrier is provided for automobiles having a trunk with a door which exposes the rear of the trunk when open, which comprises a platform adapted to lie horizontally within the trunk or extend therefrom, a side-piece for each side of the platform adapted to enter completely into the trunk and to swing on a hinging means fixed near each side of the trunk to a position along a side-edge of the platform whether the platform lies within or extends from the trunk, a pivot-head connecting each side-piece to the platform in pivotal and sliding engagement so that each side-piece will swing as aforesaid when the pivotal axis of each pivot-head is substantially in line with the hinging axis of each hinging means and the platform will slide in a direction substantially parallel to the side-edge of the platform, and a tail-piece extending across and hinged to the tail-edge of the platform and adapted to engage the side-pieces to support the platform when extended.

In a form of the invention, each pivot-head is connected to the platform by a pivot at such a location on the platform that, when the platform is extended with the tail-piece in engagement with the side-pieces, the pivotal axis of each pivot-head is substantially out of line with the hinging axis of each hinging means whereby the side-pieces are prevented from swinging.

A luggage carrier according to the invention greatly increases the luggage carrying capacity of an automobile without the disadvantages of known carriers. When not in use, the carrier may be slid into the trunk where it lies against the floor and walls without substantially reducing the capacity of the trunk, and leaves the outer appearance of the car unaltered. When extended, the carrier provides the additional luggage carrying capacity required by tourists, taxi-drivers, farmers, etc.

2

The invention will be further described by reference to the following drawings which show an embodiment of it, and in which:

Figure 1 is a perspective view of an open automobile trunk fitted with a luggage carrier according to the invention, Figure 2 is a perspective view of the carrier extending from the automobile trunk, Figure 3 is a side elevation of the carrier, Figure 4 is a rear elevation of the carrier, Figure 5 is a detail of a pivot-head connecting a side-piece to the platform of the carrier, Figure 6 is a plan view of the carrier, Figure 7 is a detail of a latch, Figure 8 is a side elevation of a latch, Figure 9 is a detail of a hinge for the tail-piece, Figure 10 is a rear elevation of a trunk door support, and Figure 11 is a side elevation of the trunk door support.

In Figure 1 the carrier is shown within an automobile trunk 10 having a door 10a which exposes the rear of the trunk 10 when open. A platform 11 lies against the floor 12 of the trunk 10, and vertical side-pieces 13 of metal tubing stand along the sides of the trunk 10 with their end tubing passing through the tubes 14. The tubes 14 act as hinging means for the side-pieces 13 and are fixed to upper supports 15 and lower supports 16 which are fixed to the trunk 10. The platform 11 is connected to the side-pieces 13 by means of pivot-heads 17. A tail-piece 18 is hinged to the tail-edge of the platform 11 by hinges 19 (Figure 9) which adapt it to swing upwardly as shown in Figure 2.

When extended, as shown in Figure 2, the carrier overhangs the rear of the automobile and is supported through its tail-piece 18, the side-pieces 13, the tubes 14 and the brackets 15 and 16. Catches 20 on the tail-piece 18 are engaged by latches 21 pivoted to the side-pieces 13 by pivots 22. The latches 21 are locked in engagement with the catches 20 by locking levers 23 of which pins 24 seat in notches 25 (Figure 8). Springs 26 urge the pins 24 into the notches 25. Trackways 27 guide the pins 24 to the notches 25 when the tail-piece is being latched. Holes in strips 28 on the tail-piece 18 (Figure 7) engage pins 29 on the side pieces 13 to support the platform 11.

As shown in detail in Figure 5, the pivot-heads 17 provide pivotal and sliding engagement between the side-pieces 13 and the platform 11. Trackways 30 formed by the bottom members of the side-pieces 13 extend along the bottom of the side-pieces 13 for their full length and pass through the pivot-head 17 to provide sliding engagement. Pivotal engagement is provided by pivots 31 which connect the head-end of the platform 11 to the pivot-heads 17.

By having the pivots 31 connecting the pivot-heads 17 to the platform 11 substantially out of line with the tubes 14 when the platform 11 is fully extended as shown in Figure 3, the side-pieces 13 are prevented from swinging and the carrier is made more stable.

To extend the carrier from the position shown in Figure 1 to that shown in Figure 2, the platform 11 is pulled from the trunk on the pivot-heads 17 which slide along the trackways 30 until the pivots 31 are in line with tubes 14. The side-pieces 13, now free to swing, are swung from their positions completely within the trunk 10 as shown in Figure 1 to their positions along the sides of the extended platform 11 as shown in Figure 2. The platform 11 may be then adjusted into the position shown in Figures 2 and 3 so that the tail-piece 18 may be raised and latched to the side-pieces 13 in the manner described above. In this position, the carrier is self-supporting from the brackets 15 and 16, and ready to carry luggage.

When the carrier is extended, it may be desirable to lower the door 10a from its open position as determined by a support 32 which is usually provided in automobile trunks. To do this, a telescopic support in two sections 33 and 34 is provided (Figures 10 and 11). Section 33 hinges to the door 10a by a hinge 35 and the section 34 may be connected to the top of the tail-piece 18 by a latch 36. A thumbscrew 37 is used to set the adjustment between the sections 33 and 34, and a spring 38 holds the support when not in use as shown in Figure 1.

When the carrier is not needed, it may be returned to its position completely within the trunk 10 by unlatching the tail-piece 18, sliding the platform 11 until the pivots 31 are in line with the tubes 14, swinging the side-pieces 13 into the trunk 10, folding the tail-piece 18 against the platform 11 and sliding the platform 11 into the trunk 10 on the pivot-heads 17. The trunk door will then close leaving the exterior appearance of the car unaltered by the presence of a luggage carrier.

What I claim is:

1. A luggage carrier for automobiles having a trunk with a door which exposes the rear of the trunk when open, which comprises a platform adapted to lie horizontally within the trunk or to extend horizontally therefrom, a vertically extending side-piece for each side of the platform, means within and at the rear of the trunk hinging a vertical edge of each side-piece to the trunk, each side-piece being adapted to swing on its hinging means to a position alongside the platform whether the platform lies within or extends from the trunk, a trackway fixed along the lower edge of each side-piece and extending beneath the hinging means for the side-piece, a pivot-head for each side-piece, each pivot-head having pivotal engagement with the platform and having sliding engagement with the trackway of the respective side-piece, and a tail-piece hinged to the tail-edge of the platform and adapted to be fastened to the side-pieces when the platform is extending from the trunk.

2. A luggage carrier as defined in claim 1, in which each pivot-head is connected to the platform by a pivot at a location less distant from the tail-edge of the platform than the horizontal length of the side-pieces.

PHILIP J. COMEAU.

REFERENCES CITED

The following references are of record in the file of this patent:

UNITED STATES PATENTS

| Number | Name | Date |
|---|---|---|
| 1,941,860 | Hanson | Jan. 2, 1934 |
| 1,977,735 | Monckmeier | Oct. 23, 1934 |
| 2,091,071 | Girl | Aug. 24, 1937 |
| 2,214,575 | Cercownay | Sept. 10, 1940 |
| 2,470,314 | Lim | May 17, 1949 |